United States Patent
Park et al.

(10) Patent No.: US 9,346,125 B2
(45) Date of Patent: May 24, 2016

(54) METHOD FOR OXIDE DISPERSION STRENGTHENING OF METALLIC MATERIAL USING LASER

(71) Applicants: Sang Yoon Park, Daejeon (KR); Byoung-Kwon Choi, Daejeon (KR); Jeong-Yong Park, Daejeon (KR); Il Hyun Kim, Chungcheongnam-do (KR); Yang-Il Jung, Daejeon (KR); Dong Jun Park, Daejeon (KR); Hyun Gil Kim, Daejeon (KR)

(72) Inventors: Sang Yoon Park, Daejeon (KR); Byoung-Kwon Choi, Daejeon (KR); Jeong-Yong Park, Daejeon (KR); Il Hyun Kim, Chungcheongnam-do (KR); Yang-Il Jung, Daejeon (KR); Dong Jun Park, Daejeon (KR); Hyun Gil Kim, Daejeon (KR)

(73) Assignees: KOREA ATOMIC ENERGY RESEARCH INSTITUTE, Daejeon (KR); KOREA HYDRO AND NUCLEAR POWER CO., LTD, Gyeongsangbuk-Do (KR)

( * ) Notice: Subject to any disclaimer, the term of this patent is extended or adjusted under 35 U.S.C. 154(b) by 668 days.

(21) Appl. No.: 13/763,203

(22) Filed: Feb. 8, 2013

(65) Prior Publication Data

US 2013/0299470 A1     Nov. 14, 2013

(30) Foreign Application Priority Data

May 10, 2012    (KR) .................. 10-2012-0049704

(51) Int. Cl.
| | |
|---|---|
| *B23K 26/00* | (2014.01) |
| *B23K 26/08* | (2014.01) |
| *B23K 26/12* | (2014.01) |
| *B23K 26/32* | (2014.01) |

(Continued)

(52) U.S. Cl.
CPC .......... *B23K 26/0081* (2013.01); *B23K 26/083* (2013.01); *B23K 26/123* (2013.01); *B23K 26/144* (2015.10); *B23K 26/32* (2013.01); *B23K 26/342* (2015.10); *B23K 35/0244* (2013.01); *B23K 35/3033* (2013.01); *B23K 35/3053* (2013.01); *B23K 35/32* (2013.01); *B23K 2203/08* (2013.01); *B23K 2203/50* (2015.10); *C21D 2211/004* (2013.01)

(58) Field of Classification Search
CPC ............. B23K 26/0081; B23K 26/083; B23K 26/123; B23K 26/144; B23K 26/32; B23K 26/342; B23K 2203/08; B23K 2203/50
See application file for complete search history.

(56) References Cited

U.S. PATENT DOCUMENTS

| | | | | | |
|---|---|---|---|---|---|
| 3,549,733 | A | * | 12/1970 | Caddell | .............. B23K 26/0656 101/401.1 |
| 4,726,715 | A | * | 2/1988 | Steen | ..................... B65G 53/08 198/550.1 |

(Continued)

FOREIGN PATENT DOCUMENTS

| | | | |
|---|---|---|---|
| EP | 1127958 A2 | * | 8/2001 |
| GB | 2182349 A | * | 5/1987 |

(Continued)

*Primary Examiner* — Geoffrey S Evans
(74) *Attorney, Agent, or Firm* — Lathrop & Gage LLP

(57) ABSTRACT

An oxide dispersion strengthening (ODS) method of a metallic material using a laser is provided, which includes melting a surface of a metallic matrix placed on a movable stage by irradiating a laser onto the surface (step 1), supplying an oxide dispersion strengthening (ODS) powder at a site of the matrix surface which is melt at step 1 (step 2), and cooling the matrix in which the ODS powder is supplied at step 2 (step 3). Because oxide particles are directly supplied into previously-made sheet or tube matrix, fabrication process is simplified, fabrication cost is reduced, and end product is fabricated efficiently.

13 Claims, 4 Drawing Sheets

(51) Int. Cl.
*B23K 35/30* (2006.01)
*B23K 35/32* (2006.01)
*B23K 35/02* (2006.01)

(56) References Cited

U.S. PATENT DOCUMENTS

| | | | |
|---|---|---|---|
| 5,453,329 A * | 9/1995 | Everett | B23K 26/1411 219/121.66 |
| 5,989,491 A | 11/1999 | Isomoto et al. | |
| 6,146,476 A * | 11/2000 | Boyer | B23B 51/00 148/525 |
| 2003/0116239 A1* | 6/2003 | Lambard | C21D 6/002 148/607 |
| 2005/0227864 A1* | 10/2005 | Sutorik | B01J 21/04 502/304 |
| 2008/0185188 A1* | 8/2008 | Blue | C23C 24/08 175/374 |
| 2011/0185851 A1* | 8/2011 | Kaneko | B22F 1/0062 75/343 |

FOREIGN PATENT DOCUMENTS

| | | |
|---|---|---|
| JP | 61-091323 | 5/1986 |
| JP | 62-250162 | 10/1987 |
| JP | 62-270277 | 11/1987 |
| JP | 1-156457 A * | 6/1989 |
| JP | 2010-065302 A * | 3/2010 |
| KR | 2010/0127594 B | 12/2010 |

* cited by examiner

METHOD FOR OXIDE DISPERSION STRENGTHENING OF METALLIC MATERIAL USING LASER

CROSS-REFERENCE TO RELATED APPLICATIONS

This application claims priority from Korean Patent Application No. 10-2012-0049704, filed on May 10, 2012, in the Korean Intellectual Property Office, the disclosure of which is incorporated herein by reference in its entirety.

BACKGROUND OF THE INVENTION

1. Field of the Invention

The present invention relates to a method for oxide dispersion strengthening of a metallic material with good mechanical property at high temperature, and more particularly, to a method for oxide dispersion strengthening of a metallic material using laser, according to which surface of a metal matrix shaped into sheet or tube is melt by a laser heat source, and an oxide dispersion-strengthening (ODS) powder in nano size is supplied into a site where the melting occurs on the matrix surface, thereby causing homogenous distribution of the ODS powder within the matrix of a target alloy.

2. Description of the Related Art

As industry advances and as a demand for a mechanical part to have higher physical and mechanical properties increases, a method for strengthening an alloy is continuously studied to provide complex of different materials which has endurance to high temperature.

Solid solution strengthening, precipitation strengthening and deformation strengthening are generally used as the alloy strengthening methods. Among these, the solid solution strengthening involves selecting adequate alloying composition and dissolving the composition in the alloy preparation process. The precipitation strengthening either transforms a subject material into a phase with greater strength via heating treatment, or generates specific precipitates. The deformation strengthening or work hardening relates to difficulty of transformation of a material due to increasing dislocation density formed within the material due to deformation. All these strengthening methods have in common that these inhibit movement of dislocation acting in the deformation of the alloy. Because strengthening induces internal change of a material, the reaction mechanism either disappears or results in considerably changed effect depending on temperature of the material.

Accordingly, the oxide dispersion strengthening (ODS), which disperses oxide on a matrix to improve strength and resistance to creep at high temperature, is proposed as a good option. ODS disperses minute oxide particles with good thermal stability on a metallic matrix and provides alloys with greatly increased strength at high temperature than the solid solution strengthening or precipitation strengthening. The relatively higher mechanical strength at high temperature of the oxide dispersion strengthened metal is reported to be attributed to effective controlling on a movement of dislocation by the homogenously dispersed oxide (E. Orown: Trans Inst. Eng. Shipbuild Scotl., 89 (1946)165, F. J. Humphreys and J. W. Martin: Phil. Mag., 16 (1967)927, A. H. Clauer and B. A. Wilcox: Met. Sci. J., 1 (1967)86).

When it comes to conventional art, JP Patent Publication No. 2010-00065302 and US Patent Publication No. 2003-00116239 provide a preparation method of ODS alloy, which includes a mixing step of inputting oxide to a metallic powder as a matrix of an alloy, a mechanical alloying (MA) step of mechanically alloying the mixture, a degassing step, a hot isostatic pressing step, a hot working and cold working step, an annealing step, or the like. However, the above-mentioned preparation method is accompanied with shortcomings such as complicated processing which in turn results in prolonged preparation time, and increasing fabrication cost due to use of expensive metallic powder as a raw material.

Furthermore, U.S. Pat. No. 5,989,491 discloses a preparation method of ODS alloy which adds in advance an oxide forming agent including rare earth material such as zirconium, yttrium, cerium, or lanthanum to a melt alloy. While this preparation method provides homogenous distribution of the oxide forming agent by melting the same along with the matrix alloy, the method also includes the step of pulverization by jetting gas onto the melt alloy. That is, during gas jetting on a melt alloy, argon or nitrogen gas containing maximum 5.0% oxygen is made into alloy powder, alloy powder smaller than a predetermined size is filtered out, and the alloy powder is shaped by roll forging, HIP or hot extrusion. However, while this preparation method can homogenously distribute the oxide forming agent by melting, because powder alloy is prepared by atomization, another melting and shaping is necessary to produce an intended part. As a result, processing becomes complicated.

Korean Publication No. 2010-0127594 discloses a method for preparing ODS alloy efficiently by adding metals targeted for oxidation such as aluminum, titanium, zirconium or yttrium is added during a step of melting matrix metal of the alloy, shaping the mixture, and inputting oxygen during heating treatment of the shaped material to allow oxygen and the metal targeted for oxidation to bind to each other. However, this preparation method has shortcomings of difficulty of propagation of oxygen into the matrix metal and precisely controlling reaction ratio with the metal targeted for oxidation.

As explained above, the conventional ODS alloy preparation methods have shortcoming of different densities between oxide and matrix metal, which in turn results in non-homogenous dispersion, and it takes great time and cost to overcome the above-mentioned shortcomings because it is necessary to conduct mechanical mixture, other various processing such as HIP, and to control the heat treatment to suit the phase change interval. Furthermore, many technical and time limits are posed for the processing to supply oxygen after melting the metal targeted for oxidation with the matrix to control even nano-sized oxide. Furthermore, because the conventional art forms oxide within a bulk-sized matrix metal, strength is already increased in the initial or middle-stage of the production, elongation is decreased and it is difficult to shape the product as desired. Furthermore, special welding technique is necessary to compensate for the deteriorating homogeneity or concentration at a joining area when the prepared parts are joined with each other.

Accordingly, in an effort to find an efficient oxide dispersion strengthening (ODS) method of a metallic material to provide an end product which is economical in terms of both processing and cost, the inventors of the present invention confirmed that an ODS method of distributing oxide particles on a metallic matrix using a laser can provide simpler fabrication process, reduced fabrication cost and efficient production of end products because oxide particles can be supplied directly into a finished sheet or tube, and thus completed the present invention.

SUMMARY OF THE INVENTION

An object of the present invention is to provide an oxide dispersion strengthening (ODS) method with good mechanical property at high temperature, according to which fabrication process is simplified, fabrication cost is reduced, and end product is efficiently fabricated by supplying oxide dispersion strengthening powder directly into a previously-made sheet or tubular matrix using laser heat source and ODS powder.

To achieve the above-mentioned objects, an oxide dispersion strengthening (ODS) method of a metallic material using a laser is provided, which may include melting a surface of a metallic matrix placed on a movable stage by irradiating a laser onto the surface (step 1), supplying an oxide dispersion strengthening (ODS) powder at a site of the matrix surface which is melt at step 1 (step 2), and cooling the matrix in which the ODS powder is supplied at step 2 (step 3).

The ODS method according to the present invention distributes ODS particles into a metallic matrix using laser, and provides simplified fabrication process, reduces fabrication cost and fabricates end products efficiently.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF THE INVENTION

Figure 1:
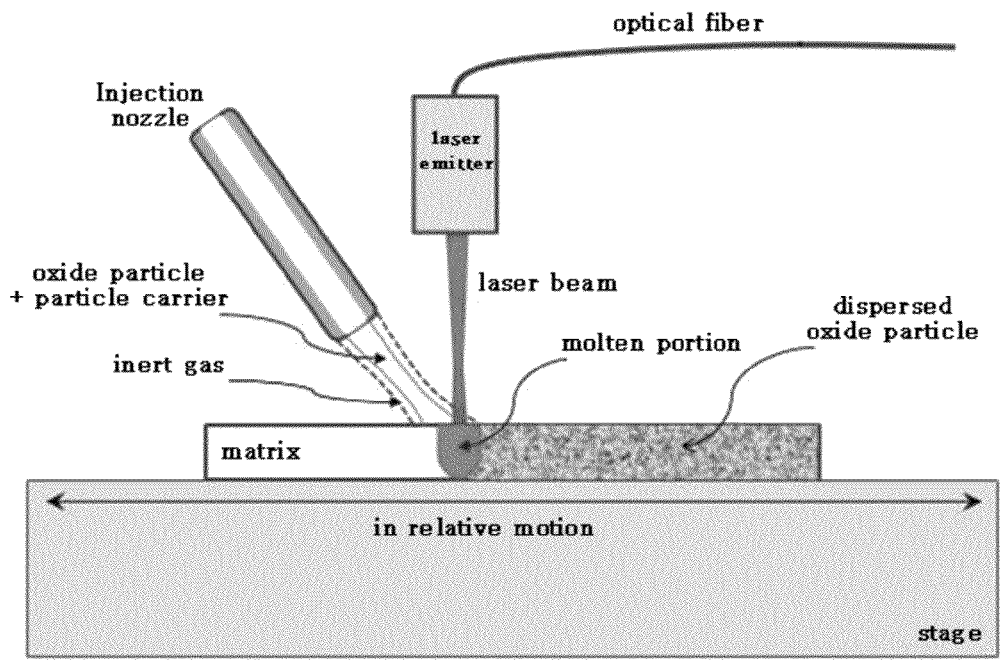
FIG. 1 is a view provided to explain an ODS method of a metallic material using a laser according to Example 1 of the present invention.

The present invention will be explained in detail below.

In one embodiment, an oxide dispersion strengthening (ODS) method of a metallic material using laser is provided, which may include steps of: melting a surface of a metallic matrix by irradiating laser onto the surface of the metallic matrix placed on a movable stage (step 1); supplying an oxide dispersion strengthening (ODS) powder to a site of melting on the matrix surface of step 1 (step 2); and cooling the matrix into which the ODS powder of step 2 is supplied.

The ODS method of a metallic material using laser according to an embodiment will be explained below.

First, in the oxide dispersion strengthening (ODS) method of a metallic material using laser according to an embodiment, step 1 relates to melting a surface of a metallic matrix by irradiating laser onto the surface of the metallic matrix placed on a movable stage.

To be specific, the metallic matrix melt at step 1 may use zirconium, iron or nickel metal matrix, in which the zirconium metal matrix may use Zircaloy-4 (Zr-98.2 wt %, Sn-1.5 wt %, Fe-0.2 wt %, Cr-0.1 w %), iron metal matrix may use T91(Fe-91.71 w %, Cr-8.29 w %, Cr-others), and nickel metal matrix may use In738 (62Ni-16 w %, Cr-8.5 w %, Co-others).

Further, the metallic matrix melt at step 1 may use various forms of matrix including sheet or tube. For example, in the oxide dispersion strengthening (ODS) method of a metallic material using laser according to an embodiment, mechanical strength is reinforced because ODS powder is directly supplied into previously-made sheet or tubular matrix. Accordingly, compared to a conventional ODS method which includes mechanical alloying step, the ODS method according to the present invention greatly provides simplified fabrication process, reduces fabrication cost and can efficiently fabricate end products.

Further, it is possible to adjust the area or depth of the site of melting, by adjusting a laser output to the site of melting on the matrix surface of step 1. In the oxide dispersion strengthening (ODS) method of a metallic material using laser according to an embodiment, because ODS powder is supplied into the molten portion of which area or depth is adjusted, it is possible to adjust the range of oxide dispersion or degree of dispersion in the matrix variously according to the laser output. Accordingly, local or general ODS is possible, to suit the need of the metallic matrix.

Furthermore, because ODS alloying is possible for the joining area of the material by welding, the ODS method according to the present invention provides advantage of reducing processing required for the joining of the ODS alloy.

Next, in the oxide dispersion strengthening (ODS) method of a metallic material using laser according to an embodiment, step 2 relates to supplying an oxide dispersion strengthening (ODS) powder to a site of melting on the matrix surface of step 1.

To be specific, the ODS powder to be supplied into the molten portion of the matrix at step 2 may use $Y_2O_3$, $Al_2O_3$, $TiO_2$, $ZrO_2$. Among the oxides available as dispersants, $Y_2O_3$ oxide is reported to have the most effective strengthening effect (I. S. Kim, T. Okuda, C. Y. Kang, J. H. Sung, P. J. Maziasz, R. L. Klueu and K. Miyahara: Met. Mater. Int., 6 (2000)513.). Considering the above, $Y_2O_3$ may preferably be used.

Further, the ODS powder to be supplied into the molten portion of the matrix may be supplied along with a carrier gas via an introducing means. The carrier gas does not react with the ODS powder and may preferably use Ar or He.

Furthermore, the introducing means to introduce the ODS powder may use an injection nozzle. The particles of ODS powder may preferably be 30-80 μm in size. If the particles exceed 80 μm in size, the particles are too large to be passed through the end of the injection nozzle to be jetted. If the particles are less than 30 μm in size, the particles can hinder the flow or air when pressure is exerted for injection, thus causing the nozzle blockage.

The carrier gas may have gas wall formed by inert gas, when the carrier gas carries the ODS powder through the introducing means. Any inert gas may be used, provided that the inert gas can inhibit oxidation by blocking the site of melting of the matrix surface by the laser irradiation with the ambient area, and may preferably be Ar or He.

If the grain size of the ODS powder is too small to be controlled by the introducing means, the ODS powder may first be diluted in a solvent and applied on the matrix surface and dried. Any solvent may be unlimitedly selected for use, provided that the solvent efficiently dissolves the ODS powder and easily evaporates. Organic solvent may be used singly or in combination. In a preferred embodiment, acetone, alcohol, or mixed solvent of acetone and alcohol may be used, or more preferably, acetone or alcohol may be used.

Next, in the oxide dispersion strengthening (ODS) method of a metallic material using laser according to an embodiment, step 3 relates to cooling the matrix into which the ODS powder of step 2 is supplied.

To be specific, if the metallic matrix is a sheet, the cooling at step 3 may be performed using a lubricant for cooling between the movable stage and the sheet. Any material may be selected for use as the lubricant for cooling purpose, provided that the material can efficiently cool the molten portion of the matrix. The lubricant for cooling may be used singly or in combination. In a preferred embodiment, solid grease or liquid grease may be used, or more preferably, all types of grease with viscosity may be used.

Further, if the metallic matrix is a tube, the cooling at step 3 may be performed while the movable stage, to which a rotary shaft is attached, moves the tube in rotary motion, and may adjust severity of cooling by adjusting flow rate of the coolant flowed into the tube.

Further, in the oxide dispersion strengthening (ODS) method of a metallic material using laser according to an embodiment, by the laser irradiation, the molten portion may be generated on the entire portion of the matrix on the movable stage which is moving, and the ODS powder may be supplied. Alternatively, the ODS powder may be supplied in the manner of fixing the movable stage in position and moving the laser emitter.

Figure 2:
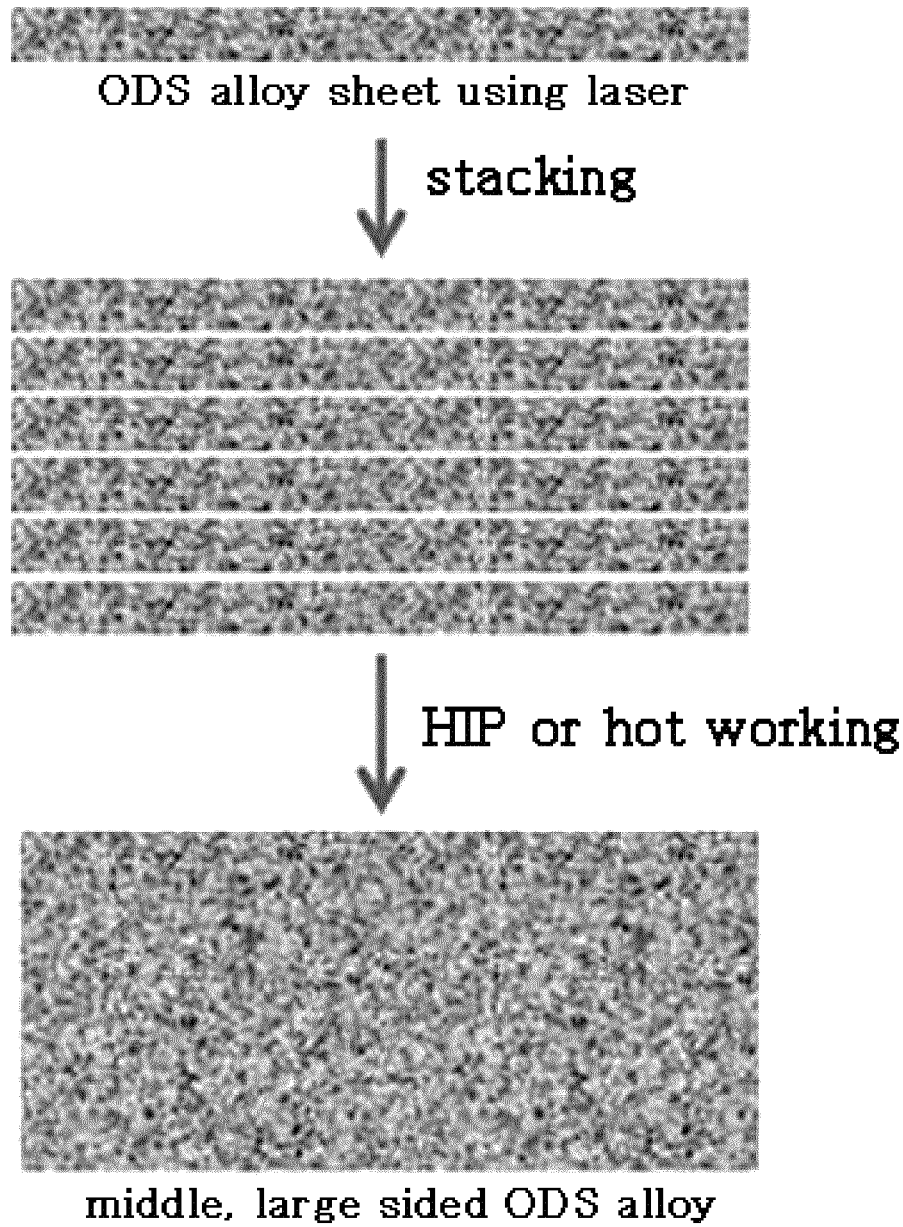
FIG. 2 is a view provided to explain an ODS method of a middle, large sized metallic material using a laser according to Example 1 of the present invention.

Further, in the oxide dispersion strengthening (ODS) method of a metallic material using laser according to an embodiment, if middle or large sized ODS alloy is necessary, referring to FIG. 2, the alloy sheets prepared by the ODS method according to the present invention may be stacked on each other, and then shaped by HIP or hot working. It is also possible to adjust the size of the alloy by adjusting the area of the sheets and the number of stacked sheets.

Referring to Experimental Example 1 of the present invention, microstructure analysis was conducted on the zirconium type ODS alloy prepared according to Example 1. As a result, it was confirmed that oxide which was 0.5 µm or less in size was homogenously dispersed. This indicates that the present invention overcomes the shortcoming of the conventional ODS method of melting a matrix and adding oxide, i.e., difficulty of controlling size, amount and distribution of oxide evenly, due to floating by the difference of densities between the dispersed oxide and the matrix and convection of the molten metal.

Further, referring to Experimental Example 2 of the present invention, the yield strength of the ODS alloys of Examples 1 to 3 was improved more than 40% compared to the initial parent material which is not prepared by the ODS method according to the present invention. The above indicates that the ODS method of a metallic material using laser according to the present invention can sufficiently increase the mechanical strength of the metal.

Certain examples and experimental examples of the present invention will be explained in detail below. However, the examples and experimental examples are provided herein only for illustrative purpose, and therefore, should not be construed as limiting the scope of the present invention.

Example 1

Preparation of ODS Alloy-1

The ODS alloy was prepared with the ODS method using laser according to the present invention, and with a system as illustrated in FIG. 1, in which the matrix was zirconium-type alloy (Zircaloy-4: Zr-98.2 wt %, Sn-1.5 wt %, Fe-0.2 wt %, Cr-0.1 w %) sheet, and ODS powder was $Y_2O_3$. The laser output was set to 300 W and $Y_2O_3$ particles were supplied to the molten metal portion melt by the laser via an injection nozzle along with the particle carrier gas (Ar). To inhibit oxidation at the site melt by the laser irradiation, the injection nozzle is so formed that the exterior thereof supplies inert gas (Ar). If the particle size of the oxide are too small to be conveyed through the injection nozzle, the ODS powder may first be diluted in the solvent such as acetone or alcohol, applied to the surface of the product, dried and then supplied to the matrix.

The size of the molten portion of the sheet (length and/or depth) may increase as the laser output increases, and if the sheet is relatively thick, one surface may first be alloyed and the opposite surface may then be alloyed. Conveyance of the sheet may be performed by conveying a stage under the sheet, or in another embodiment, a laser head may be conveyed. Cooling the sheet may be conducted at faster speed using a generally—used grease with viscosity as a lubricant for cooling purpose between the sheet and the stage.

Figure 3:
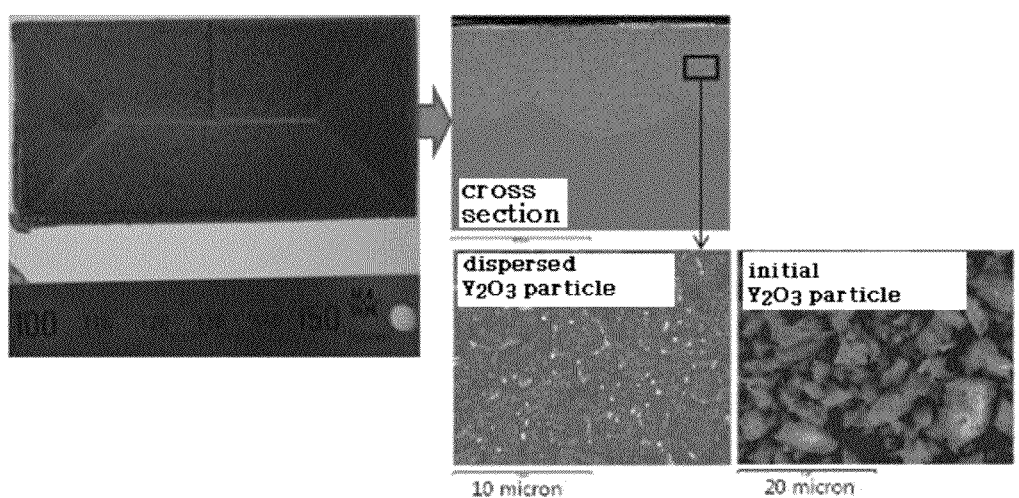
FIG. 3 shows surface, cross section, initial oxide particles and homogenously dispersed oxide particles of an alloy fabricated by the ODS method of a metallic material using a laser according to Example 1 of the present invention.

For the purpose of middle or large sized ODS alloys, referring to FIG. 2, ODS alloy sheets may be stacked on one another and shaped by HIP or hot working. It is possible to adjust the size of the alloy by adjusting the area of the sheets and the number of stacked sheets. FIG. 3 shows, on the left-hand side, the surface of the oxide alloy sheet fabricated by laser.

Example 2

Preparation of ODS Alloy-2

The ODS alloy of Example 2 was prepared with the ODS method using laser according to the present invention by the same method as Example 1, except for using the matrix of Ferritic-Martensite (FM) type iron matrix alloy (T91: Fe-91.71 w %, Cr-8.29 w %, Cr-others) sheet.

Example 3

Preparation of ODS Alloy-3

The ODS alloy of Example 2 was prepared with the ODS method using laser according to the present invention by the same method as Example 3, except for using the matrix of nickel matrix alloy (In738: 62Ni-16 w %, Cr-8.5 w %, Co-others) sheet.

Experimental Example 1

Microstructure Analysis

To investigate if oxide is homogenously distributed in the matrix of ODS alloy fabricated using laser according to the present invention, microstructure analysis was conducted on the ODS alloy matrix of Example 1, and the result is present in FIG. 3. The ODS alloy was cut into 10×10 mm segment in length and the cut surface was polished with SiC polishing paper. The polished segment was ultrasonic cleaned in 50:50 acetone-alcohol mixture and then dried. The dried segment was etched and observed under scanning electron microscope As a result, referring to FIG. 3, the ODS portion in enlargement displayed homogenous dispersion of oxide smaller than 0.5 µm in size. This is 20-fold reduction when compared with the initial particle size of $Y_2O_3$ on the rightmost-side of FIG. 3 which was approximately 10 µm. Accordingly, it was confirmed that the ODS method of a metallic material using laser according to the present invention provided ODS alloy with homogenous dispersion of oxide in the matrix.

Experimental Example 2

Tensile Test at Room Temperature

Figure 4:
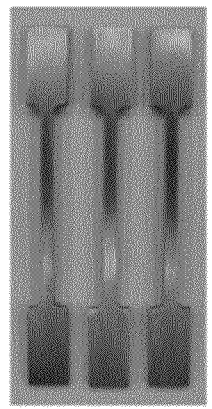
FIG. 4 shows a graph representing tensile strength of the alloy fabricated by the ODS method of a metallic material using a laser according to Examples 1 to 4 of the present invention.
Figure 4:
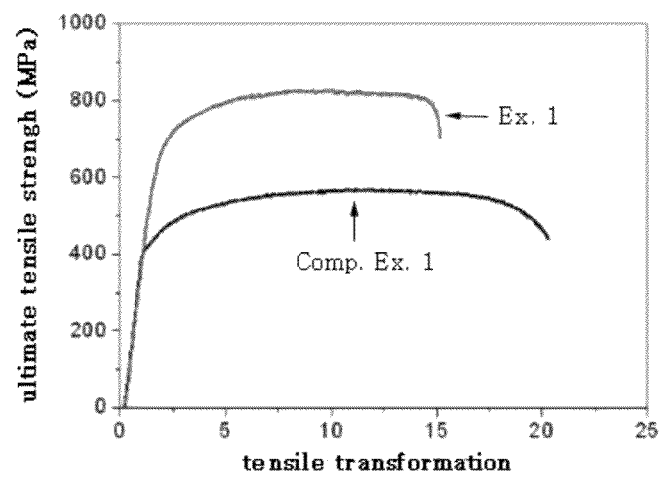

To investigate strength of the ODS alloy fabricated by the ODS method using laser according to the present invention, tensile strength test was conducted at room temperature on the ODS alloys of Examples 1 to 3. The tensile strength test at room temperature was additionally conducted on Comparative Examples 1 to 3 using initial parent materials of the ODS alloys of Examples 1 to 3. For tensile strength test, the sheet segments were processed into segments for the purpose of tensile test as shown on the left-hand side of FIG. 4, and the tensile test was conducted at 0.1 mm/min crosshead speed using tensile tester (Instron 3366). The resultant values of the ODS alloys of Examples 1 to 3 included yield strength, ultimate tensile strength and elongation, which are present in Table 1 and FIG. 4.

TABLE 1

| | | Yield strength (MPa) | Ultimate tensile strength (MPa) | Elongation (%) |
|---|---|---|---|---|
| Zirconium type alloy | Comp. Ex. 1 | 406 | 566 | 20.3 |
| | Example 1 | 648 | 827 | 15.2 |
| Iron type alloy | Comp. Ex. 2 | 817 | 1021 | 18.5 |
| | Example 2 | 1183 | 1336 | 13.1 |
| Nickel type alloy | Comp. Ex. 3 | 786 | 1232 | 14.1 |
| | Example 3 | 1122 | 1338 | 7.0 |

The results shown in Table 1 confirms that the yield strength of the ODS alloys of Examples 1 to 3 is improve respectively 40% or above, compared to the initial parent materials of Comparative Examples 1 to 3. Accordingly, it was confirmed that the ODS alloy prepared by the ODS method using laser according to the present invention provides sufficiently improved mechanical properties of the ODS alloy.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended Claims.

What is claimed is:

1. An oxide dispersion strengthening (ODS) method of a metallic material using a laser, the ODS method comprising steps of:
   completely melting a metallic matrix placed on a movable stage by irradiating a laser onto the surface (step 1);
   supplying an oxide dispersion strengthening (ODS) powder with a size greater than or equal to 30 μm and less than or equal to 80 μm into the melted matrix of step 1 and dispersing the ODS powder homogenously throughout the metal matrix (step 2);
   wherein the ODS powder is less than or equal to 0.5 μm after said step of supplying and dispersing; and
   cooling the matrix in which the ODS powder is supplied at step 2 (step 3);
   wherein the ODS powder is supplied into the melted matrix in a gas via an introducing means, said gas comprising a carrier gas containing the ODS powder and an inert gas which forms a gas wall on an outer circumference of the carrier gas.

2. The ODS method as set forth in claim 1, wherein the metallic matrix is a zirconium alloy, an iron alloy or a nickel alloy metallic matrix.

3. The ODS method as set forth in claim 1, wherein the metallic matrix is a sheet or a tube.

4. The ODS method as set forth in claim 1, comprising adjusting the melting of the metallic matrix by adjusting a laser output.

5. The ODS method as set forth in claim 1, wherein the ODS powder is one or more selected from the group consisting of $Y_2O_3$, $Al_2O_3$, $TiO_2$ and $ZrO_2$.

6. The ODS method as set forth in claim 1, wherein the introducing means comprises a nozzle.

7. The ODS method as set forth in claim 1, wherein the inert gas inhibits oxidation by blocking the site of the matrix surface which is melt from an ambient area.

8. The ODS method as set forth in claim 1, if a particle size of the ODS powder is so small that supply thereof is not controllable with an introducing means, comprising diluting the ODS powder in a solvent, applying the same onto the matrix and drying, and then supplying the same.

9. The ODS method as set forth in claim 8, wherein the solvent is one or more selected from the group consisting of acetone, ethanol, and a mixture solution of acetone and alcohol.

10. The ODS method as set forth in claim 1, wherein the matrix is a sheet and the cooling at step 3 comprises cooling with a cooling lubricant between a movable stage and the sheet.

11. The ODS method as set forth in claim 1, wherein the matrix is a tube and the cooling at step 3 comprises cooling by flowing a coolant into the tube and adjusting a flow rate thereof.

12. The ODS method as set forth in claim 1, wherein the irradiating the laser comprises generating a molten portion in the entire matrix by a movable stage which is moving, thereby supplying the ODS powder.

13. The ODS method as set forth in claim 1, wherein the irradiating the laser comprises generating a molten portion in the entire matrix by fixing a movable stage in position and moving a laser emitter, thereby supplying the ODS powder.

* * * * *